United States Patent
Dangy-Caye

(10) Patent No.: US 8,787,395 B2
(45) Date of Patent: Jul. 22, 2014

(54) METHOD FOR PLACING IN STANDBY AND WAKING UP A RESIDENTIAL GATEWAY ACCORDING TO PROGRAMMABLE TIME SLOTS

(75) Inventor: Nicolas Dangy-Caye, Rueil-Malmaison (FR)

(73) Assignee: Sagemcom Broadband SAS, Rueil Malmaison (FR)

( * ) Notice: Subject to any disclaimer, the term of this patent is extended or adjusted under 35 U.S.C. 154(b) by 126 days.

(21) Appl. No.: 13/387,604

(22) PCT Filed: Jul. 23, 2010

(86) PCT No.: PCT/EP2010/060695
§ 371 (c)(1),
(2), (4) Date: Mar. 16, 2012

(87) PCT Pub. No.: WO2011/012543
PCT Pub. Date: Feb. 3, 2011

(65) Prior Publication Data
US 2012/0163393 A1    Jun. 28, 2012

(30) Foreign Application Priority Data
Jul. 27, 2009 (FR) ........................ 09 55253

(51) Int. Cl.
*H04L 12/28* (2006.01)

(52) U.S. Cl.
USPC ........................................... 370/401

(58) Field of Classification Search
USPC ......... 370/311–312, 400–401, 458; 455/13.4, 455/522, 574, 127.1, 127.5
See application file for complete search history.

(56) References Cited

U.S. PATENT DOCUMENTS

| | | | |
|---|---|---|---|
| 6,065,123 A | 5/2000 | Chou et al. | |
| 7,245,946 B2* | 7/2007 | Liu | 455/574 |
| 7,583,985 B2* | 9/2009 | Matson et al. | 455/574 |
| 7,933,295 B2* | 4/2011 | Thi et al. | 370/493 |
| 8,194,576 B2* | 6/2012 | Kholaif et al. | 370/310 |
| 2006/0194549 A1 | 8/2006 | Janik et al. | |
| 2009/0147696 A1 | 6/2009 | Park et al. | |
| 2011/0176463 A1* | 7/2011 | Cowan et al. | 370/311 |

FOREIGN PATENT DOCUMENTS

EP    1 942 607    7/2008

OTHER PUBLICATIONS

International Search Report for PCT/EP2010/060695, mailed Sep. 10, 2010.
Foreign-language Written Opinion of the International Searching Authority for PCT/EP2010/060695, mailed Sep. 10, 2010.
Park, W-K et al., "Energy Efficient Home Gateway Based on User Service Traffic in Always-On Home Network Environment", Advances in Electronics and Micro-Electronics, (Sep. 29, 2008), pp. 121-125.
Yun, J. et al., "Designing Stand-By Gateway for Managing a Waste of Networked Home-Device Power", Integrated Network Management, (Jun. 1, 2009), pp. 121-124.

* cited by examiner

*Primary Examiner* — Frank Duong
(74) *Attorney, Agent, or Firm* — Nixon & Vanderhye PC

(57) ABSTRACT

The present invention concerns a method for putting on standby and waking up a domestic gateway, characterized in that a time slot is stored by the gateway and the gateway is put on standby at the start of the said time slot and woken up at the end of the said time slot. It also concerns a domestic gateway that implements the said method.

12 Claims, 3 Drawing Sheets

METHOD FOR PLACING IN STANDBY AND WAKING UP A RESIDENTIAL GATEWAY ACCORDING TO PROGRAMMABLE TIME SLOTS

This application is the U.S. national phase of International Application No. PCT/EP2010/060695, filed 23 Jul. 2010, which designated the U.S., and claims priority to FR application Ser. No. 09/55253, filed 27 Jul. 2009, the entire contents of which is hereby incorporated by reference.

BACKGROUND OF THE INVENTION (1) Field of the Invention

The present invention concerns a method of putting on standby and waking up a domestic gateway and a domestic gateway implementing this method.

(2) Description of Related Art

A domestic gateway is an apparatus that enables a subscriber to be able to receive at his home, via the internet, services of the television or VoIP (Voice Over Internet Protocol) type. Thus, after having connected equipment to the domestic gateway, a subscriber can access internet sites, exchange electronic messages, receive television programmes and/or telephone.

For this purpose, a domestic gateway must remain continuously awake, in particular to receive any telephone calls. In order to save energy, the subscriber can switch off his domestic gateway but this subscriber will then be obliged to switch on again manually when next used, thus not allowing him access to an external communication network in order in particular to record a television programme or place a telephone call.

The problem solved by the present invention consists of reducing the consumption of a domestic gateway.

BRIEF SUMMARY OF THE INVENTION

For this purpose, the present invention concerns a method of putting on standby and waking up a domestic gateway, characterised in that a time slot is stored by the gateway and the gateway is put on standby at the start of the said time slot and woken up at the end of the said time slot.

Thus a user can program time slots that are then stored in the gateway in order to express periods during which the user does not use the gateway and the periods during which the user is liable to use it.

According to one embodiment, the gateway switches into a nominal consumption mode when it is woken up and into a low consumption mode when it is on standby.

According to one embodiment, the supply to the gateway is cut when the gateway switches into the low consumption mode and this supply is re-established when the gateway switches into the nominal consumption mode.

According to its hardware aspect, the present invention concerns a conventional domestic gateway that is special through the fact that it implements the above method. In addition, this gateway is special since it comprises a microprocessor supplied by a supply that is connected to the electrical supply source but is distinct from the main supply.

One of the advantages of such a gateway is that a low-consumption microprocessor can be used because, while the gateway is functioning in a low consumption mode, the microprocessor uses only a limited number of functions otherwise fulfilled by the main processor. The supply to the main processor of the gateway can thus be cut, optimising the reduction in the consumption of the gateway when the latter does not need to be supplied.

BRIEF DESCRIPTION OF THE DRAWINGS

The features of the invention mentioned above, as well as others, will emerge more clearly from a reading of the following description of an example embodiment, the said description being given in relation to the accompanying drawings, among which.

DETAILED DESCRIPTION OF THE INVENTION

Figure 1:
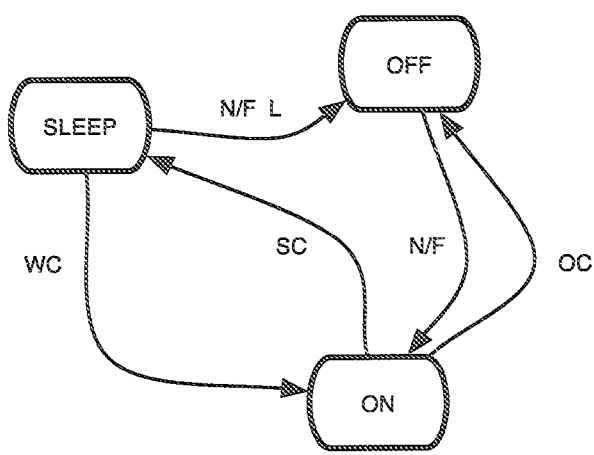
FIG. 1 shows various embodiments of the method of putting on standby and waking up a domestic gateway according to the present invention.

FIG. 1 shows various embodiments of the method of putting on standby and waking up a domestic gateway according to the present invention.

According to these embodiments, the domestic gateway functions according to three modes: ON, SLEEP or OFF.

In OFF and SLEEP modes, the gateway functions in a low-consumption mode, that is to say the main processor and other interfaces that are used conventionally by the gateway and grouped together under the name GW unit (see FIG. 3) are not supplied electrically. According to FIG. 3, the supply POWER is cut.

In ON mode, the gateway functions in a nominal consumption mode, that is to say the unit GW is supplied by the supply POWER.

The gateway switches from OFF mode to ON mode when a manual action by the user N/F occurs. For example, the user exerts a short or long pressure on a start/stop button of the gateway (ON/OFF button in FIG. 3).

The gateway switches from ON mode to OFF mode when a switching-off condition OC is satisfied.

According to one embodiment, the condition OC is satisfied when a manual action by the user occurs. For example, the user exerts a long pressure on a start/stop button of the gateway.

According to another embodiment, the condition OC is satisfied when inactivity is detected by the gateway during a predetermined period of time.

The gateway switches from SLEEP mode to OFF mode when another manual action by the user N/F_L occurs. For example, the user exerts a long pressure on the start/stop button of the gateway.

The gateway switches from SLEEP mode to ON mode when a wakeup condition WC is satisfied.

According to one embodiment, a wakeup condition WC is satisfied when an action is performed on the gateway by the user. For example, the user exerts a short or long pressure on start/stop button of the gateway.

According to another embodiment, a wakeup condition WC is satisfied when a time slot PH previously stored by the gateway ends.

For example, when the gateway switches into SLEEP mode, a counter NR counting time intervals of the same duration I is initialised to a value NRMax calculated from the exact time (for example GMT), the start of a time slot PH stored and the duration I. Next, at the expiry of each of these intervals of time of the same duration I, the counter NR is decremented by one unit. The wakeup condition WC is satisfied when the counter NR arrives at zero.

According to one embodiment of the method, if an activity is detected on the interfaces of the gateway, the gateway switches from the mode in which it is situated to ON mode. This embodiment is particularly advantageous since it makes it possible to pre-empt the functioning of the gateway whatever the mode in which it is functioning at that time. The activity of one of the interfaces of the gateway may be the detection of a telephone handset being lifted or the negotiation of the Ethernet link.

The gateway switches from ON mode to SLEEP mode when a putting on standby condition SC is satisfied.

According to another embodiment, a condition SC is satisfied when a time slot PH stored by the gateway starts.

For this, for example, the gateway, knowing the exact time (for example GMT), generates an interrupt (condition SC) as soon as the start of a time slot PH stored is equal to this exact time.

According to one embodiment, a condition SC is satisfied when inactivity on the gateway is detected for a predetermined period of time.

According to one embodiment, a condition SC is satisfied when an action is performed on the gateway by the user. For example, the user exerts a short pressure on a start/stop button of the gateway. When this putting on standby condition is satisfied, the gateway then cancels the decrementation of the counter NR if it is under way, that is to say the condition SC thus satisfied pre-empts the counter NR. The pre-emption may be followed by a reprogramming of the time slots and/or of the counter NR.

Figure 2:
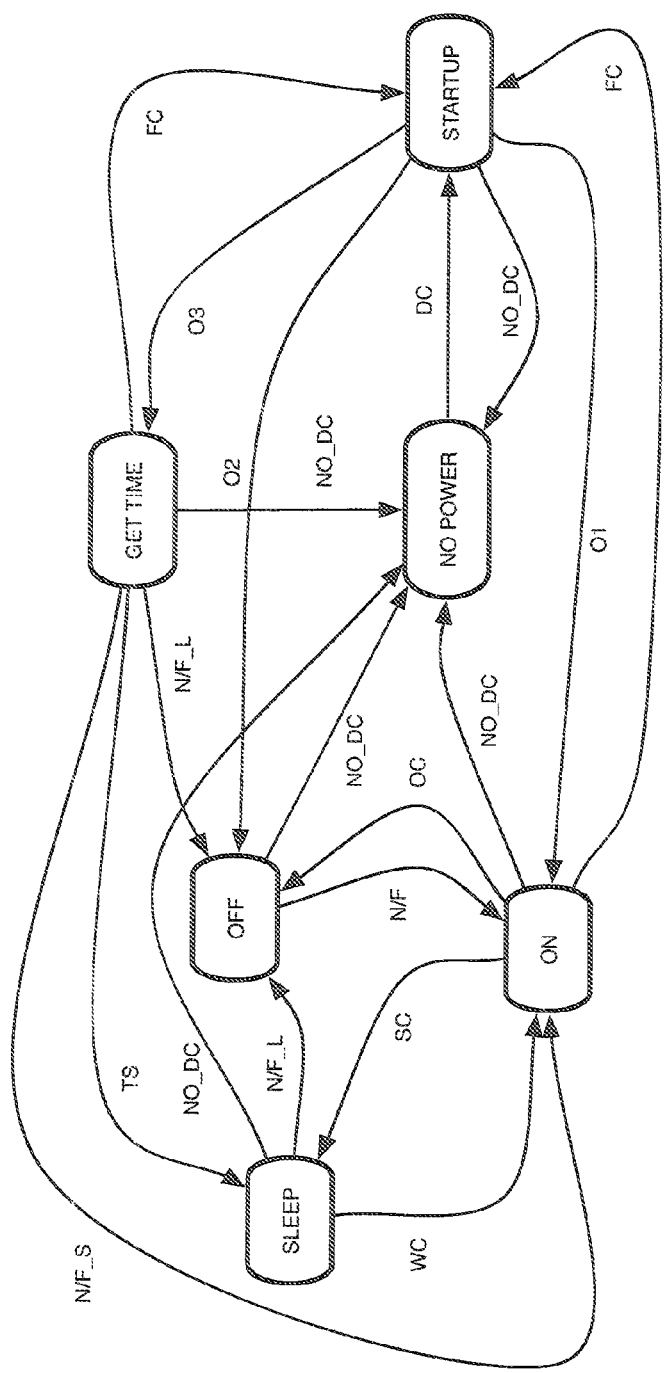
FIG. 2 shows a variant of one of the methods of FIG. 1.

FIG. 2 shows a variant of one of the embodiments of the method of FIG. 1 that makes it possible, in addition to putting on standby and waking up the gateway, to manage any main power losses that occur, in particular when there is an inopportune cut on the mains, an unwanted disconnection of the gateway from a power source or a lack of derived voltage supply to the various components of the gateway (derived supply control function). In addition, this variant makes it possible to manage the functioning of its main processor GWP of the gateway (see FIG. 2) when it is locked in a step of a process that it is supposed to execute (the function known as watchdog in English).

According to this variant, the gateway functions according to three additional low-consumption modes: NOPOWER, STARTUP or GETTIME, and is designed to store the mode in which it was functioning just before it was no longer supplied (loss of main supply). The value of this mode is saved by the gateway under the name SAVE, which can therefore take either the value ON or OFF or SLEEP in order to designate that the gateway would then function respectively in the modes ON, OFF or SLEEP.

The gateway switches from the modes ON, OFF, SLEEP, GETTIME or STARTUP to the mode NO_POWER as soon as a condition NO_DC is satisfied.

According to one embodiment, the condition NO_DC is satisfied if an inopportune cut on the mains occurs or if an unwanted disconnection of the gateway from a power source occurs.

The gateway switches from the mode NO_POWER in which it is checked whether the gateway is once again supplied, to the mode STARTUP when the condition NO_DC is no longer satisfied (condition DC satisfied).

The gateway switches from the mode GETTIME or from the mode ON to the mode STARTUP when a condition of lack of functioning FC is satisfied.

According to one embodiment, the condition FC is satisfied when the main processor GWP is locked in a step of a process that it is supposed to execute.

According to one embodiment, the condition FC is satisfied when a lack of the derived voltage supply to the various components of the gateway occurs.

In STARTUP mode, the gateway attempts to restart and, if it manages to do so, it switches to ON mode if a condition O1 is satisfied, to OFF mode if condition O2 is satisfied and to GETTIME mode if condition O3 is satisfied.

According to one embodiment, the condition O1 is satisfied if the value SAVE equals ON.

According to one embodiment, the condition O1 is satisfied when an action is performed on the gateway by the user. For example, the user exerts a short or long pressure on the start/stop button of the gateway.

According to one embodiment, the condition O2 is satisfied if the value SAVE equals OFF and no manual action is performed by the user on the gateway.

According to one embodiment, the condition O3 is satisfied if the value SAVE equals SLEEP and no manual action is performed by the user on the gateway.

In GETTIME mode, the gateway recovers the exact value of the time and recalculates the value NRMax from the end of the time slot PH that is under way, from the exact time (for example GMT) and the duration I.

The counter NR is then initialised to NRMax (condition TS satisfied) and the gateway then switches from GETTIME mode to SLEEP mode.

The operations performed during GETTIME mode can be pre-empted by a manual action by the user on the gateway such as for example by pressing on the start/stop button.

According to one embodiment, the gateway switches from GETTIME mode to ON mode when the user exerts a short pressure on the start/stop button (condition N/F_S) and to OFF mode when this pressure is long (condition N/F_L).

According to another feature, the gateway controls an indicator light V, for example an LED, which it causes to blink when the gateway is in SLEEP mode, leaves switched off when the gateway is in OFF mode and leaves switched on continuously when the gateway is in ON mode.

Figure 3:
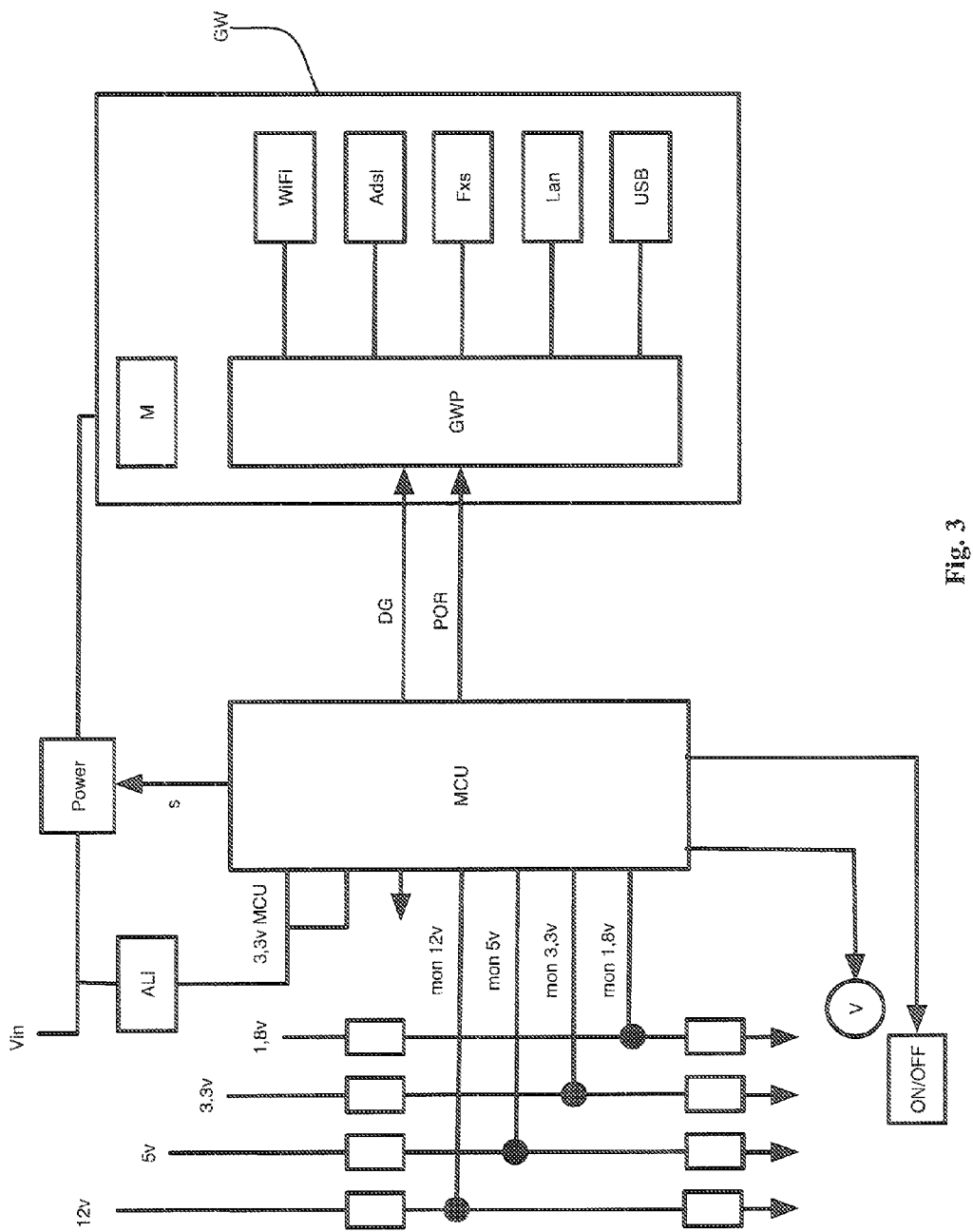
FIG. 3 shows a unit diagram of an internal architecture of the gateway according to the present invention.

In FIG. 3, a domestic gateway according to the present invention is shown schematically. The gateway comprises a unit GW that implements the conventional functions of a domestic gateway. This unit comprises in particular a main processor GWP, a memory M and means and other interfaces for communicating either with domestic appliances or with remote equipment in a local communication network or one external to the domestic installation according to various protocols (WiFi, ADSL, FXS, LAN, USB, etc). The domestic gateway also comprises a supply POWER the function of which is to supply the components and other interfaces of the unit GW with electrical energy. When the supply POWER is supplied by a voltage source referenced Vin, typically 12 V, the domestic gateway functions in nominal consumption mode. When the supply POWER is cut, the domestic gateway functions in low consumption mode.

The gateway also comprises a start/stop button ON/OFF and an indicator light V such as for example an LED.

According to one feature, the gateway comprises a microprocessor MCU supplied by a dedicated supply connected to the supply source Vin but which is distinct from the supply POWER. Thus the supply to the unit GW may be cut off and re-established independently of the supply to the microprocessor.

According to another feature, a memory of the gateway, for example the memory M, comprises instructions of a program for implementing one of the methods described in relation to FIGS. 1 and 2. These instructions, executed by the microprocessor MCU, require exchanges of information with remote equipment EQ in an external communication network (not shown), the memory M, the main processor GWP, the ON/OFF button, the indicator light V, the supply POWER and the derived voltage supply to the various components of the gateway.

The memory M stores at least one time slot PH. This time slot PH is programmed by the user through, for example, an interface of the gateway or from remote equipment, which then communicates the time slot PH to the domestic gateway, which stores it in the memory M.

The microprocessor MCU manages the counter NR and generates a condition WC according to the value thereof, as explained previously.

According to one embodiment, the main processor GWP recovers the start of the time slot PH and the duration I in order to calculate the value NRMax, which it then sends to the microprocessor MCU.

According to one embodiment, the memory M stores the duration I.

According to one embodiment, the gateway comprises means for storing, in a memory, for example the memory M, the mode in which the gateway was functioning before a main power loss (value SAVE).

The microprocessor MCU is connected to the supply POWER in order to send to it a binary signal s that controls its output value. When the signal s is at 0, the output of the supply POWER is also at 0, and the unit GW is no longer supplied. When the signal s is at 1, the output of the supply POWER is also at 1 and the unit GW is supplied.

The microprocessor MCU is connected to the main supply line of the gateway in order to detect any inopportune cutting off of the mains or the unwanted disconnection of the gateway from the supply source.

For example, if this voltage is less than 11.1 V (the threshold of detection of cutoff), the microprocessor generates the signal DG at a low level, thus indicating to the main processor GWP a loss of supply. When the voltage is greater than 11.1 V (sufficient required voltage), the microprocessor generates the signal DG at a high level, thus indicating to the main processor GWP that the gateway is connected to a sufficient supply source (dying gasp function). According to the example in FIG. 3, the input referenced "mon 12 V" is the input of the microprocessor that recovers a voltage through a resistance bridge that makes it possible to lower the threshold from 11.1 V to 0.6 V for example.

The microprocessor MCU is connected to one or even several lines that supply with derived voltages certain components of the gateway in order to detect a lack of derived voltage values.

In FIG. 3, three derived voltages are thus controlled by the microprocessor MCU, which recovers on its inputs referenced "mon 5 V", "mon 3.3 V", and "mon 1.8 V" through a resistance bridge. The microprocessor is then designed to compare each of the voltages delivered on these inputs with a threshold and thus detect a lack of derived voltage supply to the various components of the gateway.

The microprocessor is designed to send periodically to the main processor GWP a particular signal (of the type "are you alive"?) in order to determine whether the main processor GWP is locked in a step of a process that it is supposed to execute. If such is the case, the microprocessor MCU sends to the main processor GWP a re-initialisation signal POR (Power On Reset).

The microprocessor is also connected to the indicator light V in order to control its functioning as described previously.

The microprocessor MCU is connected to the button ON/OFF in order to recover a signal when a pressure is exerted by the user on this button.

According to one embodiment, the microprocessor MCU is designed to distinguish a long pressure from a short pressure on the button ON/OFF. For example, a pressure on the button ON/OFF is considered to be short when the duration of this pressure is less than 3.5 s and is considered to be long if this pressure exceeds 3.5 s.

According to one embodiment, the main processor detects a new activity or inactivity of the gateway by detecting an activity or inactivity of the communication interfaces.

According to one embodiment, the remote equipment EQ from which the gateway recovers the exact time is an NTP server. The exact value is for example recovered through an ADSL session.

The gateway in FIG. 3 therefore enables a subscriber to be able to program his putting on standby when this subscriber has not planned to use the gateway (for example at night) but also the reawakening thereof (in principle in the morning). Thus a gateway, as soon as it is woken up, sends a request to an access server (also called a wide-band server) so that a new communication session is established between a domestic appliance and an item of equipment via the external communication network.

The gateways according to the present invention therefore cause a problem of concomitance of the requests at the level of the access servers since the subscribers risk programming the same wakeup time on their gateways (for example 7 am). This concomitance of the requests therefore risks causing a crash of the access servers and thus preventing any connection with the network for all the subscribers that depend on these access servers.

To overcome this problem, the start of a time slot PH is spread randomly over a given time window A. Thus, when the method has recourse, for the first time, to the end of the stored time slot PH, this time value is shifted by a random value. The new end of the time slot PH thus modified is then stored and the method then refers to this modified value whenever it needs to know the end of the time slot PH.

Figure 4:
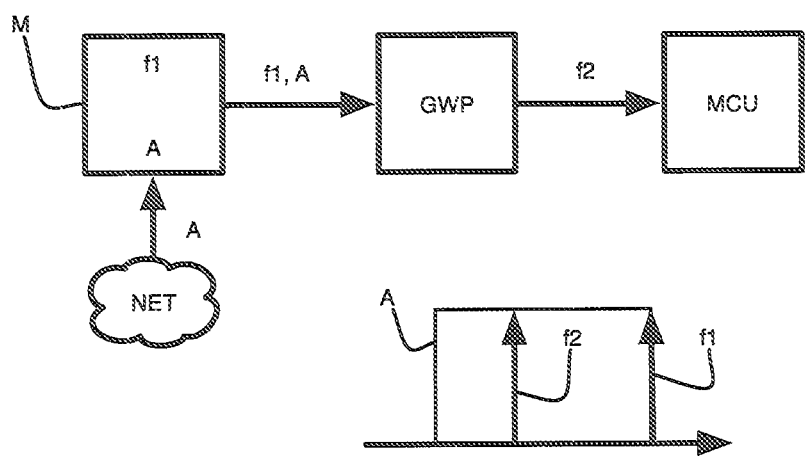
FIG. 4 illustrates an embodiment in the gateway of a shift of the end of a time slot stored by the gateway.

FIG. 4 gives a diagram that illustrates an embodiment in the gateway of this shift of the end of a time slot PH stored by the gateway.

The time widow A is here recovered from an item of equipment in a communication network NET. For example, this time window A is given by the access provider, who can thus control the capacity of his access servers by sizing the time window A. The memory stores this time window A. When the main processor GWP recovers the end f1 of the time slot PH stored by the gateway, it also recovers the time window A. This value is modified (f2) by a random value before being sent to the microprocessor MCU.

This random shift of the end times of the time slot PH is implemented in the gateway by a pseudorandom function executed by the main processor GWP.

The invention claimed is:

1. A method for putting on standby and waking up a domestic gateway, a time slot information being stored in memory by the domestic gateway, the domestic gateway being put on standby at a start of said time slot and woken up at an end of said time slot, wherein the domestic gateway performs:

retrieving a time window information from an item of equipment via a communications network to which the domestic gateway is connected, storing in memory the time window information, and shifting randomly the start of the time slot over the time window.

2. The method according to claim 1, wherein the domestic gateway performs:
switching into a nominal consumption mode, referred to as ON mode, when the domestic gateway is woken up, and
switching into a low consumption mode, referred to as SLEEP mode, when the domestic gateway is on standby.

3. The method according to claim 2, wherein the domestic gateway performs:
switching into ON mode when a predefined action is performed on the domestic gateway by the user, or when the time slot ends, or when an activity is detected on interfaces of the gateway, and
switching into SLEEP mode when the time slot begins, or when an action is performed on the domestic gateway by the user, or when inactivity of the domestic gateway is detected during a predetermined period of time.

4. The method according to claim 2, wherein the domestic gateway is able to switch into three other low consumption modes, one called NOPOWER in which it is checked whether the gateway is supplied, another called STARTUP in which the gateway restarts and another called GETTIME in which the exact time is recovered, and wherein the domestic gateway stores in memory information representative of the mode in which the domestic gateway is operating such that the domestic gateway is able to retrieve said information after a loss of main power supply.

5. The method according to claim 4, wherein the domestic gateway performs:
switching from ON, SLEEP, GETTIME or STARTUP modes to the NOPOWER mode, when an inopportune cut-off of main power supply occurs, or when an unwanted disconnection of the domestic gateway from a power source occurs, from NO-POWER mode to STARTUP mode when the main power supply is not cut off and the gateway is connected to a supply source, and
switching from GETTIME mode or from ON mode to STARTUP mode, when a main processor of the gateway is locked in a step of a process that the main processor is supposed to execute, or when a fault occurs in derived voltage supply to the various components of the domestic gateway.

6. The method according to claim 5, wherein the domestic gateway performs:
switching from STARTUP mode to ON mode, when the value of the stored mode equals ON, or when an action is performed on the gateway by the user,
switching from STARTUP mode to GETTIME mode, when the value of the stored mode equals SLEEP and no predefined action is performed by the user on the domestic gateway, and
switching from GETTIME mode to ON mode when the user exerts a pressure on a start/stop button of the domestic gateway.

7. The method according to claim 2, wherein the domestic gateway controls an indicator light in such a way that the indicator light blinks when the domestic gateway is in SLEEP mode and that the indicator light remains continuously on when the domestic gateway is in ON mode.

8. A domestic gateway comprising a main processor, a memory, a main supply that is connected to an electrical supply source and is intended to power-supply components including the main processor and interfaces of the domestic gateway, wherein said domestic gateway comprises second processor power-supplied by a second supply that is connected to the electrical supply source, wherein the domestic gateway stores in memory a time slot information such that the domestic gateway puts itself on standby at a start of said time slot and wakes up at an end of said time slot, and wherein said microprocessor is configured to enable the domestic gateway to perform:
retrieving a time window information from an item of equipment via a communications network to which the domestic gateway is connected,
storing in memory the time window information, and
shifting randomly the start of the time slot over the time window.

9. A domestic gateway according to claim 8, wherein the memory stores information representative of a mode in which the domestic gateway is operating such that the domestic gateway is able to retrieve said information after a power loss from the main supply.

10. A domestic gateway according to claim 8, wherein the other processor is connected to the main supply such that said other processor is able to detect an inopportune cut-off of the electrical supply source or an unwanted disconnection of the domestic gateway from the electrical supply source.

11. A domestic gateway according to claim 8, wherein the other processor is connected to one or more lines that supply components of the gateway with respective derived voltages, such that the other processor is able to detect a lack of derived voltage.

12. A domestic gateway according to claim 8, wherein the other processor is configured to send periodically to the main processor a special signal in order to determine whether the main processor is locked in a step of a process that the main processor is supposed to execute and the other processor is configured to send to the main processor a re-initialisation signal when the other processor detects that the main processor is thus locked.

* * * * *